United States Patent
Lander

(10) Patent No.: US 8,893,367 B2
(45) Date of Patent: Nov. 25, 2014

(54) METHOD OF PROVIDING THROUGH-THICKNESS REINFORCEMENT OF A LAMINATED MATERIAL

(71) Applicant: Rolls-Royce PLC, London (GB)

(72) Inventor: James Keith Lander, Bristol (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 13/644,842

(22) Filed: Oct. 4, 2012

(65) Prior Publication Data

US 2013/0089702 A1    Apr. 11, 2013

(30) Foreign Application Priority Data

Oct. 11, 2011  (GB) .................................. 1117467.9

(51) Int. Cl.
  *B23P 19/04* (2006.01)
  *B29C 70/24* (2006.01)

(52) U.S. Cl.
  CPC ...................................... *B29C 70/24* (2013.01)
  USPC ........................................... 29/428; 156/252

(58) Field of Classification Search
  CPC  B29C 70/543; B29C 66/1122; B29C 70/345;
     B29C 66/43441; B29C 70/30; B29C 65/62;
     B29C 70/24; B29C 66/721; D04H 1/52;
     D04H 3/07; D04H 1/4209; B29D 99/0014
  USPC ......................................................... 156/252
  See application file for complete search history.

(56) References Cited

U.S. PATENT DOCUMENTS 3,993,523 A    11/1976  Hunt et al.
4,160,055 A *   7/1979  Reed ............................. 428/131
5,470,649 A    11/1995  Farley
6,106,646 A *   8/2000  Fairbanks ..................... 156/73.3
6,436,507 B1    8/2002  Pannell
2005/0006023 A1 *   1/2005  Johnson et al. ................. 156/92
2005/0260379 A1 *   11/2005  Verhaeghe ....................... 428/95

FOREIGN PATENT DOCUMENTS

| EP | 0 089 755 A2 | 9/1983 |
| GB | 2 132 134 A | 7/1984 |
| JP | A-05-200884 | 8/1993 |
| WO | WO 2005/062747 A2 | 7/2005 |
| WO | WO 2011/065437 A1 | 6/2011 |
| WO | WO 2011069899 A2 * | 6/2011 |
| WO | WO 2011/135267 A1 | 11/2011 |

OTHER PUBLICATIONS

Feb. 4, 2013 European Search Report issued in European Patent Application No. EP 12 18 7164.
Feb. 9, 2012 Search Report issued in British Application No. 1117467.9.

* cited by examiner

Primary Examiner — David Bryant
Assistant Examiner — Ruth G Hidalgo-Hernande
(74) Attorney, Agent, or Firm — Oliff PLC

(57) ABSTRACT

A laminated composite material comprising a polymeric matrix material and plurality of fiber layers is heated to a first pre-determined temperature which is defined as the temperature at which there is a first pre-determined time interval until the matrix material reaches its gel point. The first pre-determined time interval being defined as the time required to insert the required quantity of through-thickness reinforcement fibers into the laminated material. A plurality of holes is formed in the laminated material; each hole being formed by inserting a needle having a conical tip, into the laminated material. A reinforcing element is then inserted into each of a respective one of the plurality of holes.

15 Claims, 4 Drawing Sheets

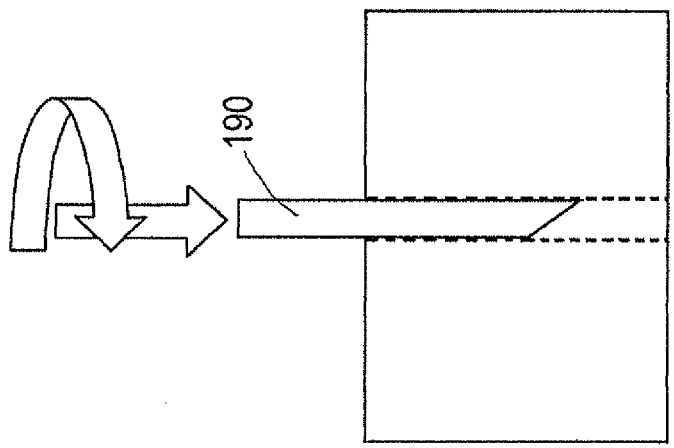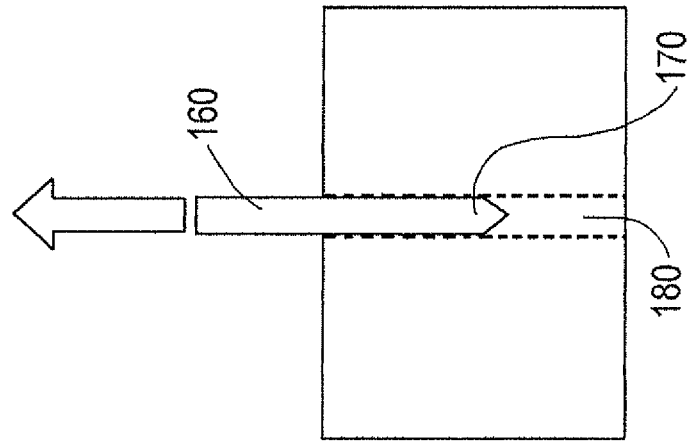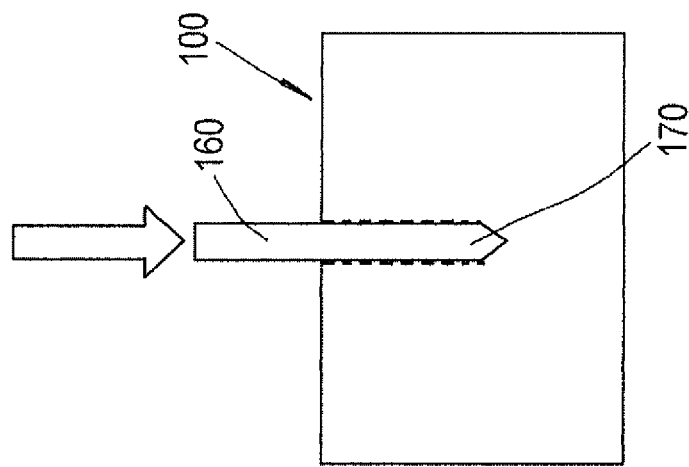

METHOD OF PROVIDING THROUGH-THICKNESS REINFORCEMENT OF A LAMINATED MATERIAL

This invention claims the benefit of UK Patent Application No. 1117467.9, filed on 11 Oct. 2011, which is hereby incorporated herein in its entirety.

FIELD OF THE INVENTION

This invention relates to a method of providing through-thickness reinforcement of a composite material and particularly, but not exclusively, to a method of providing through-thickness reinforcement of a laminated composite material.

BACKGROUND

Laminated composite materials, in which reinforcing fibres are held within a polymeric matrix, are extensively used in many engineering applications. Such materials can generally provide a higher strength and stiffness per unit weight than conventional metallic materials. This makes such composite materials advantageous for weight sensitive applications, such as those in the field of aerospace.

A known problem with laminated composite materials is their poor inter-laminar, or through-thickness, mechanical properties in comparison to the corresponding in-plane properties. Such low inter-laminar strength and fracture toughness can constrain the design of composite parts and may even limit the use of such materials for certain applications.

One solution to this problem is the use of a toughened matrix material. Such matrix materials are generally significantly more expensive than conventional matrix materials, often have poor high temperature properties and may still not provide a sufficient increase in fracture toughness.

An alternative solution to improving inter-laminar strength properties is the insertion of through-thickness fibres into the laminated material. Various techniques have been developed for the insertion of such reinforcing fibres.

One such technique involves the use of stitching to insert the through-thickness reinforcement fibres. This requires the use of a needle which can be in excess of 5 mm in diameter. When penetrating a fibre laminate with a needle of this size, significant cutting and deformation of the laminate's fibres can be caused. This may result in reductions in the in-plane material properties in excess of 20%.

In addition, the use of a continuous fibre for the through-thickness reinforcement may cause a kink to form in the top few plies of the laminate as a result of the loop of fibre traversing from one stitch to the next. This can also result in a reduction in the in-plane properties of the material.

An alternative method for inserting through-thickness reinforcing fibres into the laminated material is stapling or z-pinning. These reinforcing fibres are generally fibrous in structure and formed with a 45° chamfer at the insertion end.

A problem with conventional z-pinning techniques is that of the reinforcing fibres being deflected from the desired insertion trajectory by the interaction of the end chamfer with the densely packed fibres of the laminate. This can result in the inserted fibres being incorrectly angled or curved relative to the plane of the laminate, which can significantly reduce their through-thickness reinforcing properties.

A further problem with the conventional z-pinning process is that the fibrous reinforcing pins can split or fracture during insertion as a result of the need to force the pins through the densely compacted fibre layers of the laminate. This can reduce the effectiveness of the presence of the reinforcing pins.

STATEMENTS OF INVENTIONS

According to a first aspect of the present invention there is provided a method of providing through-thickness reinforcement of a laminated material, the laminated material comprising a polymeric matrix material having a gel point, the method comprising the steps of:

(a) providing a laminated material;
(b) heating the laminated material to a first pre-determined temperature, the first pre-determined temperature being defined as the temperature at which there exists a first pre-determined time interval until the gel point is reached;
(c) forming a plurality of holes in the laminated material; and
(d) inserting a reinforcing element into each of a respective one of the plurality of holes.

In one embodiment of the invention, the reinforcing element is formed as a parallel sided cylinder or fibre. In other embodiments, the element may have other geometries such as, for example, a tapered or other shaped cylinder and/or may be fluted or ribbed.

The step of heating the material to the first pre-determined temperature causes the dynamic viscosity of the matrix material to reduce significantly from its value at room temperature. This enables the hole forming step to be carried out more easily and quickly since the matrix material is more fluid.

Once the first pre-determined temperature is reached, there is a finite, first pre-determined time interval within which the holes must be formed and the corresponding reinforcing fibres must be inserted before the matrix material starts to cure. Once the cure process has started it is unlikely to be possible to form holes or insert fibres without damaging the material.

In the method of the present invention, the entire volume of the laminated material is heated to the first pre-determined temperature, for example by using an oven. In other embodiments of the invention, the laminated material may be selectively heated using focussed microwave energy. This may be useful if the laminated material is large and/or a large quantity of reinforcing fibres is required to be inserted.

By inserting the reinforcing fibre into a pre-formed hole in the laminated material, the risk of the fibre splitting or being deflected by the surrounding fibres of the laminate is significantly reduced.

Optionally, each of the plurality of holes is formed by inserting a needle into the laminated material, the needle having a conically shaped tip.

The use of a needle having a sharpened, conical tip, in conjunction with the reduced viscosity as outlined above, allows the fibres of the laminate to be deflected by the needle during its passage through the material which minimises the possibility of the needle damaging the laminate fibres.

In addition, the symmetrical nature of the conical tip of the needle minimises the possibility that the needle will be deflected laterally at it passes through the laminated material. This helps to make the hole, which will receive the reinforcing fibre, more accurately aligned with its intended path.

Optionally, the needle extends through the laminated material.

Conventional reinforcing fibres are generally formed with a chamfered tip (approximately 45°) which is intended to aid the fibres' insertion into the laminated material.

If the insertion depth of the reinforcing fibre is equal to the thickness of the laminated material, the chamfer reduces the effective length of the fibre. The magnitude of the reduction in effective length is dependent upon the chamfer angle, for example for a 45° chamfer the effective length is reduced by a length approximately equal to the fibre diameter. This reduction in effective length can reduce the reinforcing effect of the fibres on the laminated material.

By forming the hole completely through the laminated material, the reinforcing fibre can be inserted into the laminated material such that the chamfered end portion passes completely through the material. Thus the effective length of the reinforcing fibre is equal to its inserted depth (i.e. the thickness of the laminated material).

Optionally, the diameter of the needle is preferably less than approximately 1.00 mm, more preferably less than approximately 0.80 mm and most preferably less than approximately 0.55 mm.

Reinforcing fibres which are used for the conventional through-thickness reinforcement of composite materials are available in a range of diameters. A typical commonly used reinforcing fibre has a diameter of 0.28 mm or 0.51 mm.

It is preferable to use a needle having a diameter approximately equal to, or slightly larger than, the diameter of the corresponding reinforcing fibre. This is because the viscous nature of the laminated material's matrix, resulting from its heating to a first pre-determined temperature, causes the material surrounding the hole to recover when the needle is withdrawn from the material, thus reducing the hole's diameter.

Optionally, the needle is rotated about its lengthwise axis as it is inserted into the laminated material.

Rotation of the needle around its longitudinal axis as it is inserted into the laminated material reduces the force required to insert the needle into the laminated material by enabling the needle to more easily pass between the fibres of the material.

Optionally, the needle comprises a surface coating, such that a coefficient of friction of the coated needle is less than a corresponding coefficient of friction of the uncoated needle.

Reducing the coefficient of friction of the surface of the needle reduces the force required to insert the needle into the laminated material and also reduces the tendency for the matrix material to adhere to the needle.

Optionally, the plurality of holes is formed simultaneously by a plurality of needles.

A typical composite component which is to be formed with through-thickness reinforcement may have up to approximately 25,000 through-thickness reinforcing fibres. If the reinforcing fibres are each inserted individually it is likely that the processing time will be excessively long which will make the process time-consuming, expensive and thus impractical.

By forming a plurality of holes in a single operation, the process can be significantly speeded up and the costs reduced. This makes the method more cost effective and thus commercially viable.

Optionally, ultrasonic energy is applied to the or each needle as it is inserted into the laminated material.

The application of ultrasonic energy to the needle as it is inserted into the material causes localised heating of the laminate in contact with the needle which results in localised softening which in turn aids insertion.

Optionally, the reinforcing element comprises an angled tip.

Optionally, the reinforcing element is formed from the group comprising boron, carbon, glass, silicon carbide, aluminium oxide, aluminium nitride, rigid phenolics, rigid polyimides, rigid epoxies and composites of such materials.

The reinforcing element may be formed from a material which is compatible with the matrix of the laminated material.

Optionally, the reinforcing element is rotated about its lengthwise axis as it is inserted into a respective hole in the laminated material.

As mentioned above, conventional reinforcing fibres are generally formed with a 45° chamfer at their insertion tip. The formation of a hole in the laminated material into which the reinforcing fibre is inserted can significantly reduce the tendency of the fibre to be deflected from its defined insertion path by its interaction with the closely packed fibres of the laminate.

By rotating the reinforcing fibre as it is inserted into the pre-formed hole, the tip chamfer does not remain in the same location for the duration of the insertion operation but rather is continuously rotated around the longitudinal axis of the fibre. This further reduces the tendency of the fibre to be deflected from its pre-defined path by the fibres of the laminate.

The rotation of the reinforcing fibre along its longitudinal axis may be in either direction and/or may be oscillatory. For example, the oscillatory motion may take the form of a sequence of consecutive clockwise and smaller counter-clockwise rotations.

Optionally, the needle is cooled to a second pre-determined temperature, the second pre-determined temperature being less than the first pre-determined temperature and being defined as the temperature at which there exists a second pre-determined time interval until the gel point is reached.

As mentioned above, by heating the laminated material to a first pre-determined temperature, the viscosity of the laminate's matrix is significantly reduced. This can result in the matrix material which surrounds the newly formed hole recovering to partially close or fill the hole on removal of the needle.

Cooling the needle to a second pre-determined temperature, which is less than the first pre-determined temperature, prior to its insertion into the heated laminated material, results in the needle locally cooling the matrix material immediately surrounding the hole as it is inserted into the laminate. This increases the viscosity of the matrix material in the region immediately around the hole and reduces the tendency of the material to recover into the newly formed hole.

In one arrangement, the needle is cooled to approximately −20° C. prior to its insertion into the heated laminated material. In other arrangements, the needle may be cooled to higher temperatures which, in any event, are likely to be less than room temperature.

Other aspects of the invention provide devices, methods and systems which include and/or implement some or all of the actions described herein. The illustrative aspects of the invention are designed to solve one or more of the problems herein described and/or one or more other problems not discussed.

BRIEF DESCRIPTION OF THE DRAWINGS

There now follows a description of an embodiment of the invention, by way of non-limiting example, with reference being made to the accompanying drawings in which:

FIGS. 5a and 5b show schematic views of the insertion of a needle into a laminated composite material to form a hole; and FIG. 6 shows a schematic view of the insertion of a reinforcing fibre into a hole in a laminated composite material.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION

Figure 1:
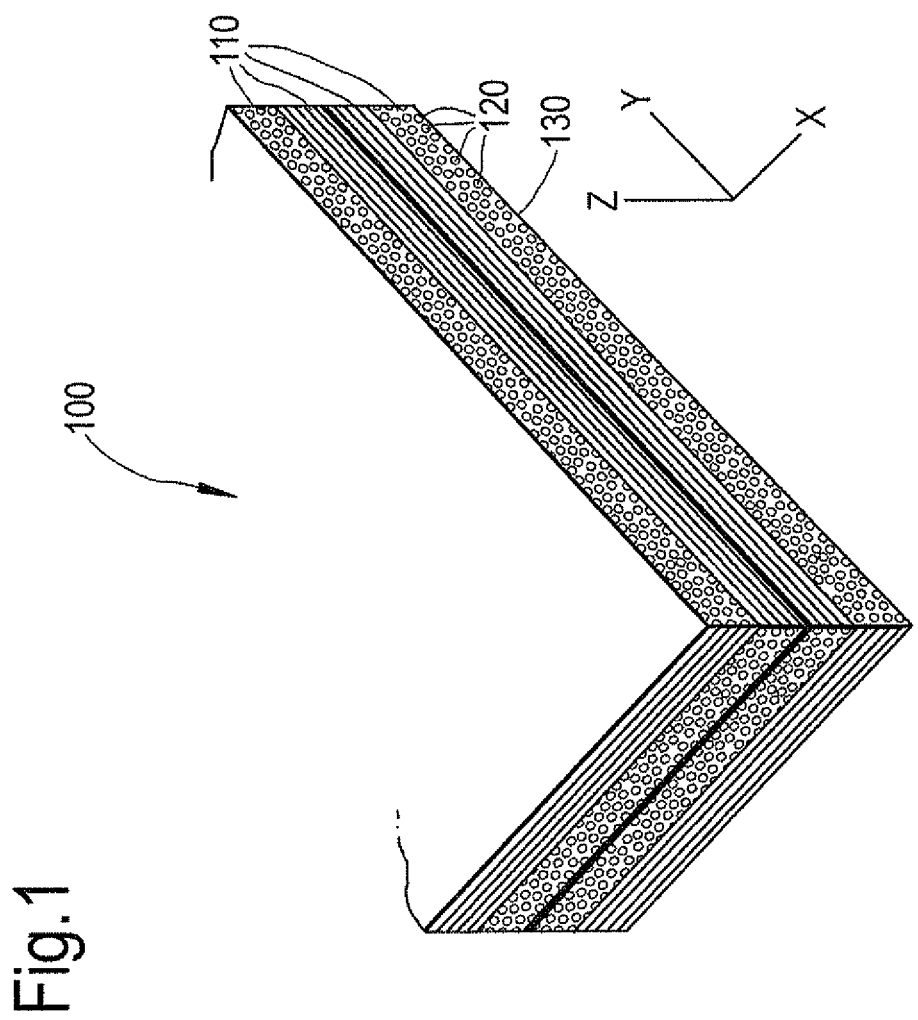
FIG. 1 shows a schematic, partial sectional view of a conventional composite laminate material.

FIG. 1 shows an example of a laminated composite material 100 comprising a plurality of fibre layers 110. In the embodiment of FIG. 1, each of the fibre layers 110 comprises a plurality of uni-directionally aligned fibres 120 held within a matrix material 130. In alternative arrangements, the fibre layers may comprise fibres having other orientations.

The relative fibre orientation of each of the layers 110 together with the quantity of fibre layers 110 is determined by the design loads to which the finished component is to be subjected.

The method of the present invention involves heating the uncured composite laminate material 100 to a first pre-determined temperature.

The first pre-determined temperature will be unique to each matrix material 130 and is determined on the basis of the matrix material's curing parameters, rheology and gelation time, and the first pre-determined time interval.

The first pre-determined time interval is the time available to complete the insertion of through-thickness reinforcing fibres into the material 100, and is dependent on the geometry of the finished component and the quantity of reinforcing fibres.

Figure 2:
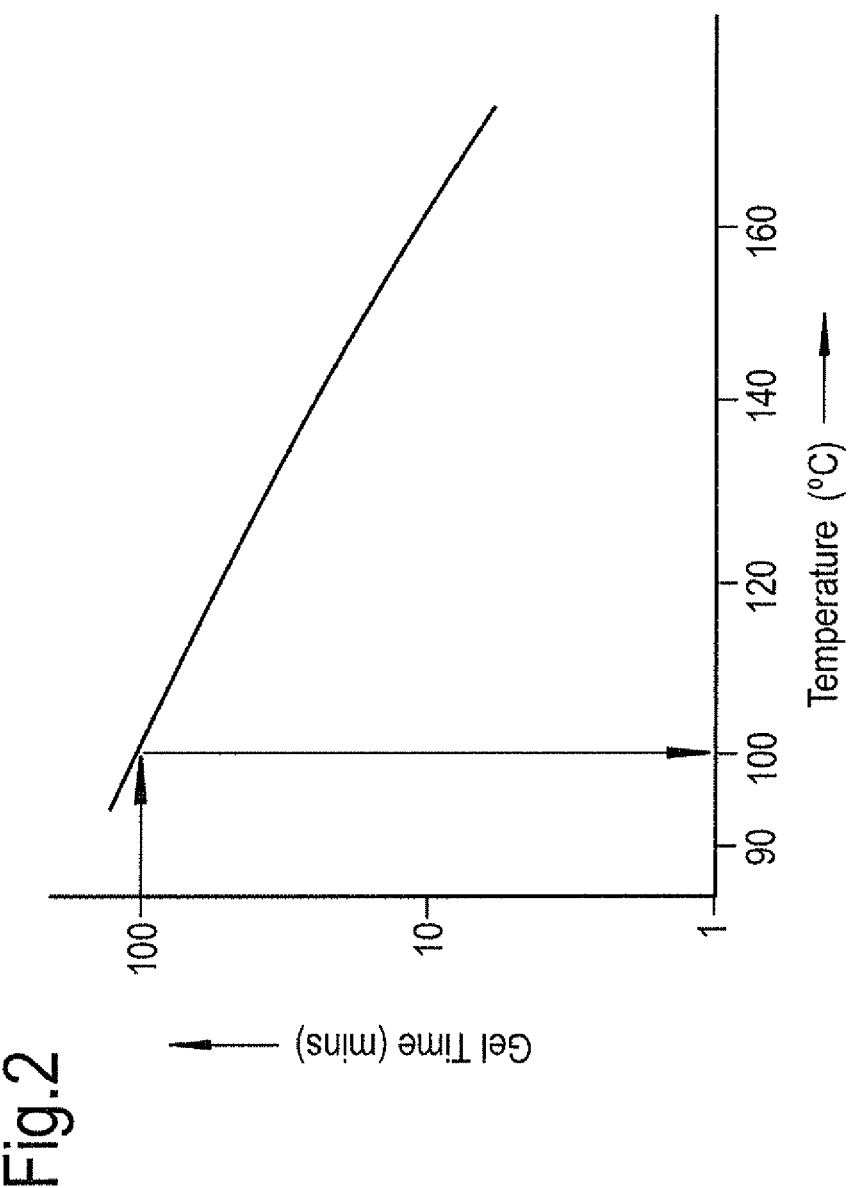
FIG. 2 shows a plot of gel time vs. temperature for a typical epoxy resin used with a laminated composite material.

FIG. 2 shows a Gel Time plot (gel time vs. temperature) for an epoxy resin material which is typical of that which might be used in a laminated composite material. This data can readily be obtained from the matrix material supplier.

The gel time plot indicates the time available at any particular temperature until the gel point of the material is reached. The gel point is defined as the start of the cure reaction for the matrix material, i.e. the point at which the molecules of the matrix material begin linking together (or gelling) and the material starts to harden.

Referring to FIG. 2, if a first pre-determined time interval of 100 minutes is required to complete the reinforcing fibre insertion process it can be seen that the first pre-determined temperature will be 100° C.

Figure 3:
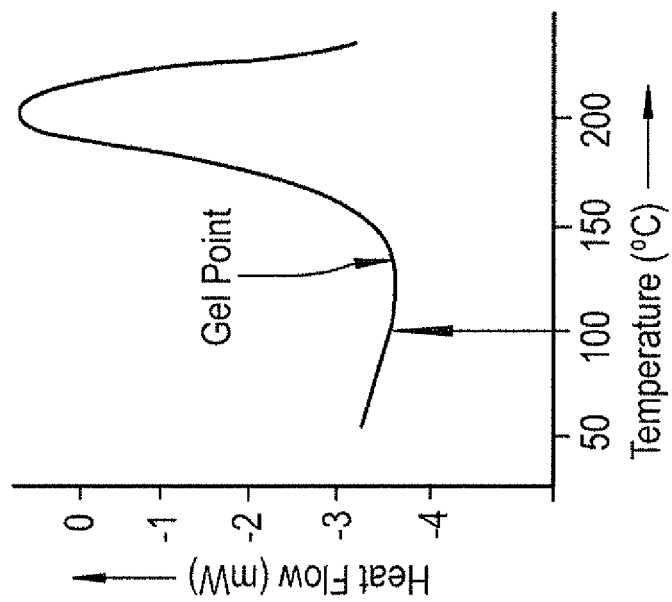
FIG. 3 shows a plot of dynamic viscosity vs. temperature for the epoxy resin of FIG. 2.

FIG. 3 shows a rheology plot (dynamic viscosity vs. temperature) for the epoxy resin material of FIG. 2. It can be seen from FIG. 3 that by heating the laminated material to the first pre-determined temperature (in this case, 100° C.) the viscosity of the epoxy resin matrix material will be considerably lower than at room temperature. This reduction in viscosity greatly aids the process of inserting the reinforcing fibres.

The gel point is shown in FIG. 3 as the inflection point of the rheology plot, i.e. the point where the reduction in viscosity induced by heating ceases and further heating causes a rapid increase in viscosity as the material starts to cure or harden.

Figure 4:
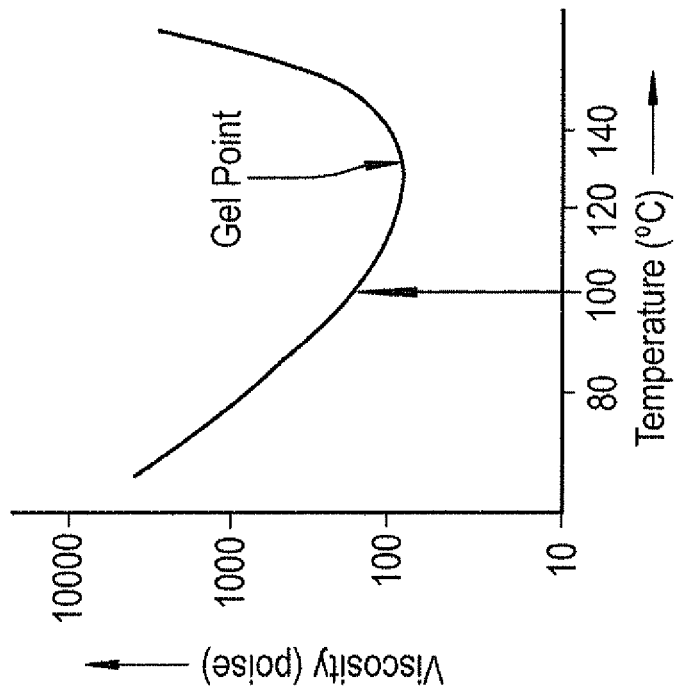
FIG. 4 shows a plot of heat flow vs. temperature for the epoxy resin of FIG. 2.

A further check on the suitability of the first pre-determined temperature can be made from the Cure plot (heat flow vs. temperature) for the epoxy resin, as shown in FIG. 4. It can be seen from FIG. 4 that, for the present example, the first pre-determined temperature (100° C.) is below the temperature at which the resin begins to cure or harden, indicated by the peak in the curve. Thus, the matrix material is in a viscous state which greatly eases the insertion of the reinforcing fibres.

As mentioned above, the gel point corresponds to the start of the cure reaction in the resin. This point is indicated in FIG. 4 as the onset of the increase in heat flow with increasing temperature.

Once the whole of the laminated material has reached the first pre-determined temperature, a needle 160 having a sharpened, conical insertion tip 170 is first inserted into the material and then removed to form a hole 180, in readiness for the subsequent insertion of a reinforcing fibre 190. This is illustrated in schematic form in FIGS. 5a and 5b.

The needle 160 has a solid, cylindrical form and a diameter of 0.30 mm. In other arrangements, needles of different diameter may be used. However, the diameter of the needle 160 should be greater than the diameter of the reinforcing fibre 190 to be used, which in the present invention is 0.28 mm.

While the holes 180 may be formed individually, in the present invention an automated manipulator (not shown) is used to simultaneously insert a plurality of needles 160 into the laminate material 100, thus forming a plurality of holes 180 in a single operation.

As mentioned above, by heating the composite material 100 to a first pre-determined temperature, the viscosity of the matrix material 130 is significantly reduced which enables the laminate fibres 120 to be deflected by the needle 160 as it passes through the material. This, in turn, reduces the potential for the needles 160 to damage the laminate fibres 120 during the hole forming step.

Each needle 160 is provided with a smooth, polished surface which minimises frictional resistance between the needle 160 and the laminated material as the needle 160 is inserted and removed. This smooth surface also minimises the pick-up of resin material or the catching of the fibres 120 on the needle 160 during the hole forming step.

Following the formation of the hole, a reinforcing fibre 190 is aligned with the hole 180 and inserted into the laminated material. The reinforcing fibre 190 may be rotated about its longitudinal axis as it is inserted into the material.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person of skill in the art are included within the scope of the invention as defined by the accompanying claims.

What is claimed is:

1. A method of providing through-thickness reinforcement of a laminated material, the laminated material comprising a polymeric matrix material having a gel point, the method comprising the steps of:
   (a) providing a laminated material;
   (b) heating the laminated material to a first pre-determined temperature, wherein the first pre-determined temperature is determined on the basis of the gel point of the polymeric matrix material, the first pre-determined temperature being less than a temperature at which the polymeric matrix material begins to cure;
   (c) forming a plurality of holes in the laminated material; and (d) inserting a reinforcing element into each of a respective one of the plurality of holes.

2. The method as claimed in claim 1, wherein each of the plurality of holes is formed by inserting a needle into the laminated material, the needle having a conically shaped tip.

3. The method as claimed in claim 2, wherein the needle extends through the laminated material.

4. The method as claimed in claim 2, wherein the diameter of the needle is less than approximately 1.00 mm.

5. The method as claimed in claim 2, wherein the needle is rotated about its lengthwise axis as it is inserted into the laminated material.

6. The method as claimed in claim 2, the needle comprising a surface coating, such that a coefficient of friction of the coated needle is less than a corresponding coefficient of friction of the uncoated needle.

7. The method as claimed in claim 2, wherein the plurality of holes is foamed simultaneously by a plurality of needles.

8. The method as claimed in claim 2, wherein ultrasound energy is applied to the or each needle as it is inserted into the laminated material.

9. The method as claimed in claim 1, wherein the reinforcing element comprises an angled tip.

10. The method as claimed in claim 1, wherein the reinforcing element is formed from the group comprising boron, carbon, glass, silicon carbide, aluminium oxide, aluminium nitride, rigid phenolics, rigid polyimides, rigid epoxies and composites of such materials.

11. The method as claimed in claim 1, wherein the reinforcing element is rotated about its lengthwise axis as it is inserted into a respective hole in the laminated material.

12. The method as claimed in claim 2, wherein the needle is cooled to a second pre-determined temperature, wherein the second pre-determined temperature is less than the first pre-determined temperature.

13. The reinforced laminated material formed by a method as claimed in claim 1.

14. The method as claimed in claim 2, wherein the diameter of the needle is less than approximately 0.80 mm.

15. The method as claimed in claim 2, wherein the diameter of the needle is less than approximately 0.55 mm.

* * * * *